(12) United States Patent
Johnson et al.

(10) Patent No.: US 10,371,350 B2
(45) Date of Patent: Aug. 6, 2019

(54) ASYMMETRIC TURNING FILM WITH MULTIPLE LIGHT SOURCES

(71) Applicant: 3M INNOVATIVE PROPERTIES COMPANY, St. Paul, MN (US)

(72) Inventors: Nicholas A. Johnson, Burnsville, MN (US); Gilles J. Benoit, Minneapolis, MN (US); John A. Wheatley, Lake Elmo, MN (US); Kenneth A. Epstein, St. Paul, MN (US); David Scott Thompson, West Lakeland, MN (US); Michael E. Lauters, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 104 days.

(21) Appl. No.: 15/300,707

(22) PCT Filed: Mar. 27, 2015

(86) PCT No.: PCT/US2015/022925
§ 371 (c)(1),
(2) Date: Sep. 29, 2016

(87) PCT Pub. No.: WO2015/153329
PCT Pub. Date: Oct. 8, 2015

(65) Prior Publication Data
US 2017/0175976 A1   Jun. 22, 2017

Related U.S. Application Data

(60) Provisional application No. 61/973,720, filed on Apr. 1, 2014.

(51) Int. Cl.
*G02B 5/02* (2006.01)
*G02B 5/04* (2006.01)
(Continued)

(52) U.S. Cl.
CPC ........... *F21V 5/08* (2013.01); *F21V 5/002* (2013.01); *F21V 9/14* (2013.01); *G02B 5/0231* (2013.01);
(Continued)

(58) Field of Classification Search
CPC .... G02B 6/0088; G02B 6/005; G02B 6/0023; G02B 6/0036; G02B 19/0019; G02B 27/0972
(Continued)

(56) References Cited

U.S. PATENT DOCUMENTS 6,222,689 B1 * 4/2001 Higuchi ............... G02B 6/0053
                                                          362/620
6,342,981 B1   1/2002 Stiens
(Continued)

FOREIGN PATENT DOCUMENTS

CN   102011981      4/2011
JP   2005-235661    9/2005
(Continued)

OTHER PUBLICATIONS

International Search Report for PCT International Application No. PCT/US2015/022925, dated Dec. 1, 2015, 8 pages.

*Primary Examiner* — William J Carter
(74) *Attorney, Agent, or Firm* — Michael Stern

(57) ABSTRACT

Optical systems are disclosed. More particularly, optical systems including an asymmetric turning film (110) with at least a first (120) and second light source (130) are disclosed. Selection of geometries for the asymmetric turning film can enable different output viewing angles depending on the selective illumination of the first light source, the second light source, or both. The optical systems disclosed may be suitable in both luminaires and displays.

13 Claims, 2 Drawing Sheets

(51) Int. Cl.
*G02B 19/00* (2006.01)
*F21V 5/08* (2006.01)
*F21V 8/00* (2006.01)
*F21V 5/00* (2018.01)
*F21V 9/14* (2006.01)

(52) U.S. Cl.
CPC ......... *G02B 5/0278* (2013.01); *G02B 6/0053* (2013.01); *G02B 19/0028* (2013.01); *G02B 19/0047* (2013.01); *G02B 5/045* (2013.01); *G02B 6/0068* (2013.01)

(58) Field of Classification Search
USPC .................................................. 362/600–634
See application file for complete search history.

(56) References Cited

U.S. PATENT DOCUMENTS

| | | | |
|---|---|---|---|
| 6,560,026 | B2 | 5/2003 | Gardiner |
| 6,746,130 | B2 * | 6/2004 | Ohkawa ............... G02B 6/0031 362/611 |
| 7,085,060 | B2 | 8/2006 | Matsushita |
| 7,153,017 | B2 * | 12/2006 | Yamashita ............. G02B 5/045 362/606 |
| 7,201,510 | B2 | 4/2007 | Yamashita |
| 7,677,733 | B2 | 3/2010 | Brott |
| 8,059,229 | B2 | 11/2011 | Shinkai |
| 9,261,640 | B2 | 2/2016 | Koike |
| 2002/0057497 | A1 | 5/2002 | Gardiner |
| 2006/0139956 | A1* | 6/2006 | Soh ........................ G02B 6/005 362/615 |
| 2007/0053206 | A1 | 3/2007 | Yamashita |
| 2010/0271838 | A1 | 10/2010 | Yamaguchi |
| 2011/0221999 | A1 | 9/2011 | Shiau |
| 2011/0304784 | A1 | 12/2011 | Hirota |
| 2012/0154450 | A1 | 6/2012 | Aho |
| 2012/0236403 | A1 | 9/2012 | Sykora |
| 2012/0327507 | A1 | 12/2012 | Padiyath |
| 2013/0038928 | A1 | 2/2013 | Padiyath |
| 2013/0250427 | A1 | 9/2013 | Lee |
| 2013/0265625 | A1 | 10/2013 | Facke |
| 2014/0085570 | A1 | 3/2014 | Kuwata |
| 2014/0092622 | A1* | 4/2014 | Pijlman ................ G02B 6/0046 362/555 |
| 2015/0029442 | A1 | 1/2015 | Kokie |

FOREIGN PATENT DOCUMENTS

| | | |
|---|---|---|
| JP | 2007-041431 | 2/2007 |
| JP | 2008-305728 | 12/2008 |
| JP | 2009-093989 | 4/2009 |
| JP | 2010-277098 | 12/2010 |
| JP | 2012-042879 | 3/2012 |
| TW | M331676 | 5/2008 |
| WO | WO 2001-022131 | 3/2001 |
| WO | WO 2008-117917 | 10/2008 |
| WO | WO 2012-066798 | 5/2012 |
| WO | WO 2013-012865 | 1/2013 |

\* cited by examiner

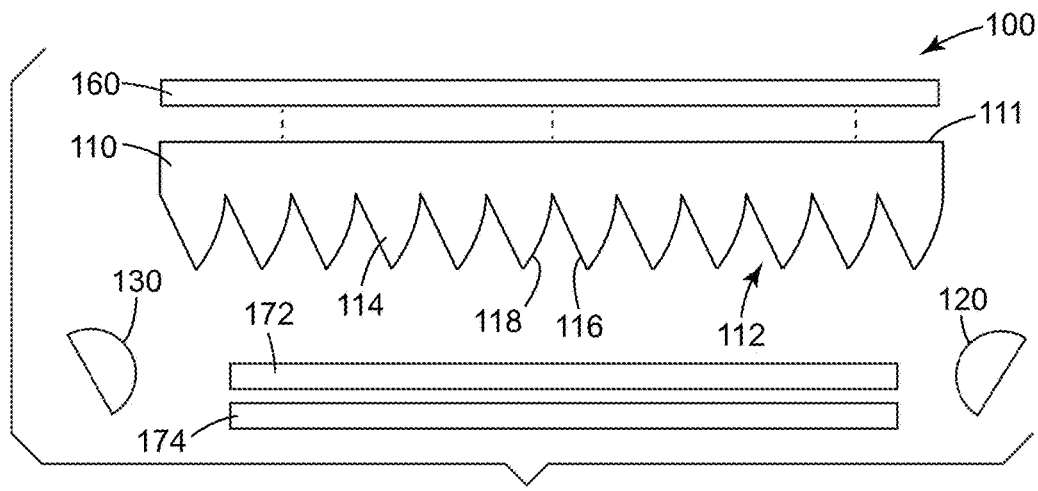
*Fig. 1*
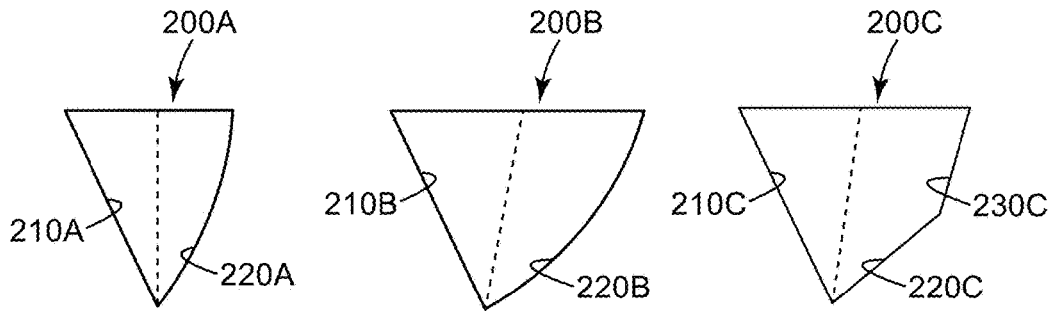
*Fig. 2a*  *Fig. 2b*  *Fig. 2c*
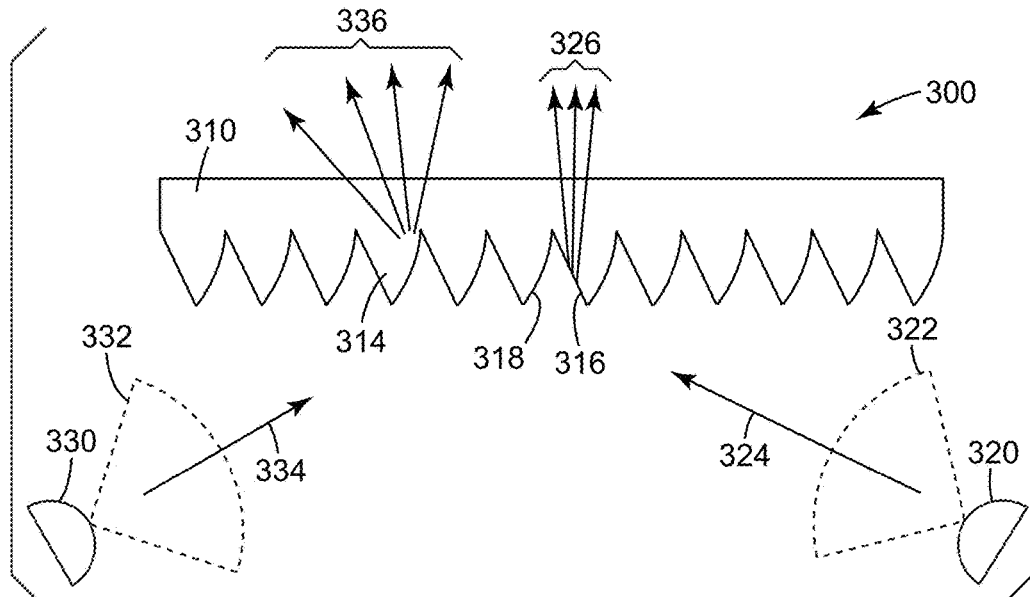
*Fig. 3*

ASYMMETRIC TURNING FILM WITH MULTIPLE LIGHT SOURCES

CROSS REFERENCE TO RELATED APPLICATIONS

This application is a national stage filing under 35 U.S.C. 371 of PCT/US2015/022925, filed Mar. 27, 2015, which claims the benefit of U.S. Provisional Application No. 61/973,720, filed Apr. 1, 2014, the disclosure of which is incorporated by reference in their entirety herein.

BACKGROUND

Turning films are used in many display and lighting applications to change the angular distribution of light. Turning films generally have features which operate by refracting and/or reflecting light. Turning films may be used in conjunction with light sources to provide a desired light output.

SUMMARY

In one aspect, the present disclosure relates to an optical system. The optical system includes a first light source and a second light source having differently orientated light distributions, an asymmetric turning film including a first major surface and a second major surface, where the first major surface is substantially smooth and the second major surface includes a plurality of microstructures each having a first face having a first shape and a second face having a different second shape, where light from the first light source is preferentially reflected by the first face but not the second face and where light from the second light source is preferentially reflected by the second face but not the first face. In some embodiments, the optical system further includes a lightguide configured to transport light from at least one of the first light source and the second light source. The optical system may include a second turning film disposed on the opposite side of the lightguide from the first asymmetric turning film. In some embodiments, the second turning film may be an asymmetric turning film. In some embodiments, the asymmetric turning film has a plurality of microstructures each having a third face having a third shape and a fourth face having a different fourth shape, where light from the first light source is preferentially reflected by the third face but not the fourth face and light from the second light source is preferentially reflected by the fourth face but not the third face.

In some embodiments, the lightguide is wedge-shaped. In some embodiments, the optical system further includes a second lightguide configured to transport light from at least one of the first light source and the second light source. In some embodiments, the lightguide and the second lightguide are stacked. In some embodiments, the first shape is substantially flat and the second shape is substantially curved. In some embodiments, each of the plurality of microstructures is the same lateral cross-sectional shape. In some embodiments, both the first shape and the second shape are substantially flat. In some embodiments, both the first shape and the second shape are substantially curved.

In some embodiments, the optical system each microstructure of the plurality of microstructures further includes a third face having a third shape, where either light from the first light source is preferentially reflected by the first face and the third face but not the second face or light from the second light source is preferentially reflected by the second face and the third face but not the first face. In some embodiments, the optical system further includes a second plurality of microstructures, each including a third face having a third shape and a fourth face having a different fourth shape, where the third face preferentially reflects light from the first light source but not the second light source, where the fourth face preferentially reflects light from the second light source but not the first light source, and where at least two of the first shape, the second shape, the third shape, and the fourth shape are different. In some embodiments, the second major surface of the asymmetric turning film includes at least one of an antireflective coating or an antireflective structured surface. In some embodiments, at least one of the first face or the second face includes a sawtooth or sinusoidal surface. In some embodiments, the plurality of microstructures includes linear microstructures.

In some embodiments, the optical system has two display modes, where in the first mode, only the first light source emits light, and in the second mode, only the second light source emits light. In some embodiments, the optical system has a third mode, where in the third mode, both the first light source and the second light source emits light. In some embodiments, at least one of the first light source and the second light source includes a plurality of LEDs. In some embodiments, at least one of the first light source and the second light source emits substantially white light. In some embodiments, at least one of the first light source and the second light source emits non-white light.

In another aspect, the present disclosure relates to an optical system having a display surface and two display modes, where in the first mode, the display surface emits light having a first characteristic set of viewing angles, and where in the second mode the display surface emits light having a second characteristic set of viewing angles, where the first characteristic set of viewing angles and the second characteristic set of viewing angles have different widths.

BRIEF DESCRIPTION OF THE DRAWINGS

FIG. 1 is a schematic side elevation cross-section of an asymmetric turning film with multiple light sources.

FIGS. 2A, 2B, and 2C are a series of cross-sections showing exemplary face types for the microstructures of the asymmetric turning film of FIG. 1.

FIG. 3 is a schematic side elevation cross-section showing the operation and general optical principles of the asymmetric turning film and multiple light sources of FIG. 1.

DETAILED DESCRIPTION

Figure 4:
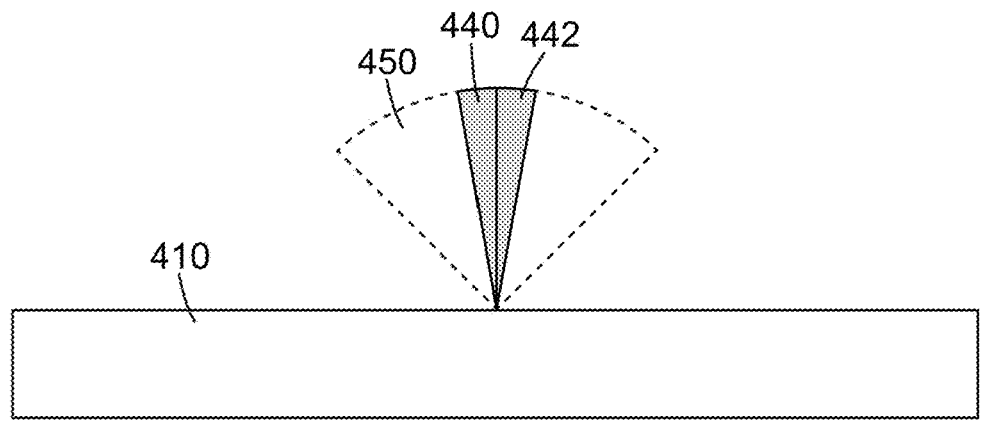
FIG. 4 is a schematic side elevation cross-section showing first and second sets of characteristic viewing angles.

Asymmetric turning films may be used in conjunction with multiple light sources to provide useful or desirable output distributions of light. For example, the asymmetric turning films may have faces that reflect light from one light source but not another. In some embodiments the asymmetric turning films may have a plurality of microstructures or prisms, each having at least a first and second face. If these faces are shaped or orientated differently with respect to corresponding light sources (i.e., a light source that is preferentially reflected by the face), then the resulting output distribution may be different. In some cases, the light sources may be selectively driven or illuminated to produce variable or switchable distributions of light.

FIG. 1 is a schematic side elevation cross-section of an asymmetric turning film with multiple light sources. Optical system 100 includes asymmetric turning film 110 which has first smooth major surface 111 and second structured surface 112. Second structured surface 112 includes a plurality of microstructures 114 each having first face 116 and second face 118. First light source 120 and second light source 130 are disposed such that they provide light incident on asymmetric turning film 110. Asymmetric turning film 110 may be laminated to polarizer 160. Optical system may also include first lightguide 172 and second lightguide 174.

Asymmetric turning film 110 may be any suitable thickness and may be made from any suitable material. In some embodiments, asymmetric turning film 110 will be formed from a polymeric material, such as polycarbonate, polyethylene terephthalate, polyethylene naphthalate, poly(methyl methacrylate) and copolymers and blends of the same. In some embodiments, asymmetric turning film 110 may be optically transparent or have low haze and high clarity to avoid undesirably scattering incident light. In some embodiments, the asymmetric turning film may have a sufficiently high index of refraction, such as 1.5 or greater, to ensure that total internal reflection occurs at a sufficiently broad range of angles. Other appropriate materials include acrylics, polystyrenes, methyl styrenes, acrylates, polypropylenes, polyvinyl chlorides, and the like. In some embodiments the material, dimensions, or both of asymmetric turning film 110 may be selected in order to produce a flexible film.

First smooth surface 111 is substantially smooth. However, first smooth surface 111 need not be completely smooth in all embodiments, and may qualify as a substantially smooth surface as long as the surface does not contain microstructures. For example, an anti-wetout or anti-glare beaded coating may be included or incorporated on the surface of first smooth surface 111, and such a surface may still be considered substantially smooth for the purposes of this application. In other words, smooth is not used in the sense of not rough; instead, it is used in the sense of not structured.

Second structured surface 112 includes microstructures 114. Each of microstructures 114 may be linear microstructures; that is, microstructures 114 may extend along a direction with substantially the same or identically the same cross-sectional shape (in the exemplary configuration of FIG. 1, along the axis into/out of the page). Microstructures 114, and more generally, the second structured surface 112 of asymmetric turning film 110 may be formed through any suitable process, such as a microreplication process. For example, second structured surface 112 may be formed through cutting (fly cutting, thread cutting, diamond turning or the like) a suitable tool with the negative of the desired structure and pressing a compliant but curable or hardenable material against the tool surface. The material may be subsequently hardened or cured (for example, through exposure to light such as ultraviolet light), leaving second structured surface 112 with the desired features. Other processes may be possible, including casting and curing with an electroplated, laser cut, or etched tool, using photolithography such as two-photon mastering of a tool in conjunction with a cast and cure process, or even direct machining or an additive three-dimensional printing process.

Microstructures 114 may all be the same or they may different. Patterns and arrangements of microstructures 114 are discussed in more detail elsewhere in the application, particularly in conjunction with FIGS. 2 and 3. Each of microstructures 114 has a first face 116 and a second face 118. First face 116 and second face 118 optically correspond to first light source 120 and second light source 130. In that sense, and discussed in more detail in conjunction with FIG. 3, first face 116 preferentially reflects light from first light source 120 but not second light source 130, and second face 118 preferentially reflects light from second light source 130. The overall arrangement of the microstructures on second structured surface 112 may have any suitable pitch and may or may not have land (flat areas) between microstructures 114. Microstructures 114 may be any appropriate size, and in many cases may be on the millimeter or micrometer scale, in some cases between 10 and 100 micrometers or between 10 and 300 micrometers. The pitch or size of microfeatures 114 may increase, decrease, both increase and decrease, or remain constant for all or portions of second structured surface 112.

First light source 120 and second light source 130 may be any suitable light source or combination of light sources. In many cases, light sources for first light source 120 and second light source 130 are light emitting diodes (LEDs). First light source 120 and second light source 130 are referred to in the singular, but each may represent a bank or series of light sources. For example, first light source 120 may be a series of LEDs extended along the axis into/out of the page. In some embodiments, light sources emit substantially white light. In some embodiments, certain of the components of first light source 120 and second light source 130 emit light of different wavelengths that may together create white light. "White" light may refer to any suitable desirable color point that may be perceived as a viewer as white light and may be adjusted or calibrated depending on the application. In some embodiments, first light source 120 and/or second light source 120 may emit light in one or more of the ultraviolet range, the visible range, or the near-infrared range of the electromagnetic spectrum. First light source 120 and second light source 130 may also be cold cathode fluorescent lights (CCFLs) or even, in some embodiments, incandescent light sources. The light sources and any corresponding injection, collimation, or other optics may be selected to provide any suitable wavelength or combination of wavelengths, polarizations, point spread distributions, and degrees of collimation.

Because first face 116 reflects light preferentially from first light source 120 but not second light source 130, and second face 118 reflects light preferentially from second light source 130 but not first light source 120, asymmetric turning film 110 essentially functions as a first film having first faces when first light source 120 is illuminated, like a second film having second faces when second light source 130 is illuminated, or even as both first and second films when both the first and second light sources are illuminated.

FIGS. 2A, 2B, and 2C are a series of exemplary microstructure types for the asymmetric turning film of FIG. 1. First microstructure 200A is substantially as shown in FIG. 1. First face 210A is substantially linear (or, more specifically planar, because the microstructures run along an axis into/out of the page). Second face 220A is curved consistent with a substantially parabolic section. The dashed line in first microstructure 200A runs from the midpoint of the base of the microstructure (the plane substantially parallel to the land of the asymmetric turning film or the closest planar portion of the film that does not include microstructures) to its vertex, and may be referred to as the microstructure axis. The microstructure axis and its relationship to the microstructures of the asymmetric turning film may be a useful descriptive metric, including the angle between the microstructure axis and the base and the microstructure axis and the faces of the microstructures. In the embodiments of this application, the microstructure axis is not a symmetry axis.

Second microstructure 200B illustrates some of the design variation possible with microstructures for the asymmetric turning film. In second microstructure 200B, first face 210B is still substantially linear or planar, although first face 210B forms a wider vertex angle with the microstructure axis. Second face 220B is also a more gradual curve than its corresponding face in first microstructure 200A. Of course, any curvature is possible for either the first or second faces, including parabolic, hyperbolic, elliptical, or circular sections, compound curvature, or several adjacent curved sections or curved sections separated by flat sections.

Third microstructure 200C illustrates another exemplary design for an asymmetric turning film microstructure, including a multifaceted second face. In this embodiment, light incident from left to right (from the perspective of FIG. 2C) may be reflected by either second face 220C or by third face 230C. Depending at least on the incident direction and the degree of collimation of the light source, light reflected by microstructure 200C incident from left to right may have an output distribution controlled mostly by reflection off of second face 220C, controlled mostly by reflection off of third face 230C, or a distribution from reflection off of both the second and third faces. In some embodiments both the second and third faces may be described as the second face 220C, or as a compound or multifaceted second face. This multifaceted face may provide in some embodiments a split output distribution. Any combination of microstructures may be utilized on an asymmetric turning film to achieve the desired ultimate light outputs. For example, third microstructure 200C may be substituted by alternating (or otherwise interspersed) first and second microstructures each having a second face with the characteristics of second face 220C and third face 230C, respectively. From an observer's perspective, the alternating microstructure design may provide an equivalent light output appearance.

Engineered surfaces are possible on any of the faces of the microstructures. For example, a sawtooth, alternating parabolic, sinusoidal, or microfeatured (including, for example, microlenses) face geometry may be possible and desired to more effectively spread or shape the output distribution of light reflected by that face. Especially with highly collimated light sources, some applications may benefit from a wider band of light reflected off one or more of the faces of the microstructures of the asymmetric turning film.

FIG. 3 is a schematic side elevation cross-section showing the operation and general optical principles of the asymmetric turning film and multiple light sources of FIG. 1. Optical system 300 includes asymmetric turning film 310 having microstructures 314 with first face 316 and second face 318, first light source 320 having first light distribution cone 322 and first exemplary ray 324, second light source 330 having second light distribution cone 332 and second exemplary ray 334, first output distribution 326 associated with first light source 320 and first face 316, and second output distribution 336 associated with second light source 330 and second face 318.

Asymmetric turning film 310 is as described in conjunction with FIG. 1, having microstructures 314 as described in FIGS. 1 and 2A-2C. Microstructures 314 are illustrated in FIG. 3 as being substantially identical for ease of illustration, but the microstructures may change shape, size, rotation, or pitch along one or more portions of asymmetric turning film 310. In some embodiments, microstructures 314 are spatially variant, and in some embodiments there may be discrete portions of microstructures 314 having similar characteristics, but different characteristics from neighboring portions of asymmetric turning film 310.

Light from first light source 320 is emitted within first light distribution cone 322. The degree of collimation may depend on both light source 320 and any accompanying collimation or injection optics (for example, a lightguide). In some embodiments, particularly when first light source 320 includes a bank of parallel light sources, the light distribution cones effective merge to create an extended wedge (for example, as if the cross-section of the first light distribution cone were projected into or out of the page). The light distribution cone may also be an extended wedge in embodiments where the light sources are linear light sources, such as a CCFL tube. In any event, for explanatory purposes, light from first light source 320 is represented by first exemplary ray 324, which is incident on asymmetric turning firm 310. Because asymmetric turning film 110 will have an index of refraction higher than air, light traveling from air into the turning film (as depicted in FIG. 3) will be refracted but not substantially reflected by second face 318, except from Fresnel reflections at the interface. These Fresnel reflections may be reduced by providing an anti-reflection coating or treatment on the surface of the asymmetric turning film. In some embodiments, anti-reflection may be provided by an antireflective structured surface, such as a moth's eye structure or the like. Exemplary ray 324 is then substantially reflected by first face 316, provided that the incidence angle is subcritical for the turning film/air interface as to be totally internally reflected. The reflection off first face 316 for all of light emitted from first light source 320 incident on asymmetric turning film 310 produces a first output distribution 326 having a first set of characteristic viewing angles. An observer viewing optical system 300 would perceive light only at the characteristic viewing angles (at least for light corresponding to first light source 320).

Similarly, for light from second light source 330, light falls within second light distribution cone 332, and is represented by second exemplary ray 334. The first and second light sources have differently oriented light distributions. Exemplary ray 334 is refracted as it passes through first face 316 but is substantially not reflected (except for Fresnel reflections). Second exemplary ray 334 is reflected at the interface created by second face 318, where the sum of all light emitted from second light source 320 incident on asymmetric turning film 310 produces second output distribution 336 having a second set of characteristic viewing angles. The second set of characteristic viewing angles may be different from the first set of characteristic viewing angles, as depicted in FIG. 3. This may be due to the face geometry, the size and overall arrangement of the microstructures and their placement relative to the light sources, or the optical characteristics of the light sources including wavelength, collimation, and emission distribution (i.e., Lambertian). To minimize scattering, antireflective coatings may be placed on the microstructures, the backside of the turning film, or even on other components of the overall system not pictured, including polarizers and the like.

In some embodiments, optical system 300 includes one or more lightguides. Lightguides are generally solid transparent optical components that transport light through total internal reflection and have carefully designed and arranged features or specific geometries to provide control over the extraction of light along its length and/or width. In these cases, it may be useful to think of each point on the emission surface of the lightguide (in the reference frame of FIG. 3, likely the top) as being a virtual source of a light distribution cone such as those associated with the light sources. The design and geometry of the lightguide (such as, for example, a wedge-shaped lightguide) and the shape and distribution of extractors may alter the shape or width of such light distribution cones. Certain extractor designs may be used to emit highly collimated light at a desired angle. In some embodiments, optical system 300 may include just one lightguide, with each of the light sources configured to inject light into sides of the lightguide. In some embodiments, one of the first and second light sources injects light into a lightguide, but the other of the first and second light sources does not. In some embodiments, there are two lightguides, which may be stacked or otherwise disposed vertically, and the first and second light sources are coupled to inject light into the first and second lightguide, respectively. Optical system 300 may also include a specular or semi-specular reflector disposed on the side of the lightguide or lightguides opposite the turning film.

In some embodiments, optical system 300 may include a hollow lightguide. In some embodiments, such a hollow lightguide may be made of a pair of highly reflective specular, semi-specular, or diffusely reflective films, such as multilayer reflectors like Enhanced Specular Reflector (ESR) and Enhanced Diffuse Reflector (EDR) (available from 3M Company, St. Paul, Minn.), separated by a certain distance. Light may be reflected and transported in air along the hollow lightguide between the films. In some embodiments, the desired output surface or surfaces of the lightguide may have perforations or areas of diminished reflectivity (i.e. increased transmission) to selectively transmit light. These perforations or transmission areas may be arranged in any useful pattern, including a gradient, pseudorandom, or uniform arrangement. In some cases, a transflector may be provided as one or both of the films in the hollow lightguide. The transflector may be a partial reflector, a reflective polarizer, or even a brightness enhancing film. The partial reflection of the transflector helps the light travel along the hollow lightguide, while the partial transmission of the transflector allows light to exit the lightguide toward the rest of optical system 300.

In some cases, the lightguide or lightguides (solid or hollow) may extract or emit light from both a top and bottom surface. Correspondingly, optical system 300 may include a second turning film oriented to redirect light from a bottom surface or the lightguide or lightguides. In some embodiments this second turning film may be an asymmetric turning film, and in some cases it may share some or all of the characteristics of asymmetric turning film 110 and 310 shown and described in conjunction with FIGS. 1 and 3. This design modification may be desirable for certain two-sided displays and luminaires.

FIG. 4 is a schematic side elevation cross-section showing first and second sets of characteristic viewing angles. Asymmetric turning film 410 is simplified and is intended to represent all the optical components within a display or luminaire. For example, although not illustrated, at least two light sources and a series of microstructures is assumed to be include, as well as, for example, depending on the overall design and configuration, one or more lightguides. In the context of FIG. 4 (and for FIGS. 5 and 6), the top surface of asymmetric turning film 410 may be considered a display surface. FIG. 4 illustrates two sets of characteristic viewing angles. These characteristic angles (which also may be conical or wedge shaped depending on the configuration of the optical system) represent the viewing angles where an observer can either perceive image data (in the case of a display) or light (in the case of a luminaire or lamp). The first set of characteristic angles 440 and the second set of characteristic angles 450 may vary widely depending on the desired application. In this illustration, the first set of characteristic angles 440 corresponds with light from the first light source that interacts with the first face of the microstructures of the asymmetric turning film. Likewise, the second set of characteristic angles 450 corresponds with light from the second light source that interacts with the second face of the microstructures of the asymmetric turning film. The definition of these sets of characteristic angles may also vary depending on the application. For example, the edges of a set of characteristic angles may be defined as a point where light intensity drops to half of a maximum (FWHM), or it may be where it crosses a threshold of perceptibility, readability, or even a different arbitrary value for light intensity. In some embodiments, first set of characteristic angles 440 and second set of characteristic angles 450 overlap. First set of characteristic angles 440 has a midline 442 which it shares with second set of characteristic angles 450. Depending on the design of the optical system, the midline may be normal to an emission or display surface of the optical system or it may be at an angle (i.e, set of characteristic angles may not be centered on-axis). In some embodiments, each of the first and second sets of characteristic angles may have different midlines. The distribution illustrated in FIG. 4 may be suitable for luminaires and displays. For example, first set of characteristic angles 440 may be either for a narrow band task light mode in a lamp or luminaire or a privacy mode, high brightness, low power, or sunlight readability mode for a display including this optical system. Second set of characteristic angles may be useful for a broad ambient or area lighting for a luminaire or for a sharing mode for a display. Both sets of characteristic angles may together, if desired, provide hybrid functionality. Any suitable ranges of angles may be used.

Figure 5:
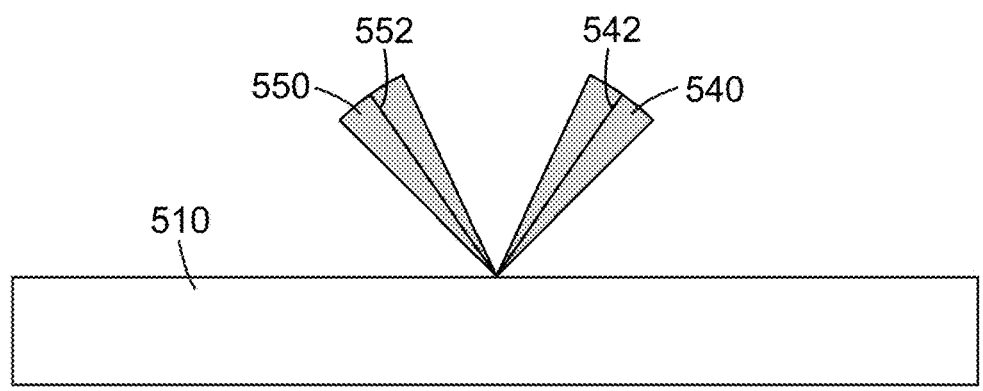
FIG. 5 is another schematic side elevation cross-section showing first and second sets of characteristic viewing angles.

FIG. 5 is another schematic side elevation cross-section showing first and second sets of characteristic viewing angles. In this case, first set of characteristic angles 540 and second set of characteristic angles 550 have similar angular widths but different midlines. First midline 552 and second midline 542 are both provided at an angle from a normal of the emission surface of asymmetric film 510, which as in FIG. 4 represents the entire optical system. A distribution configuration like this may be suitable for directional lighting or to provide two different colors for interesting or aesthetic effect.

Figure 6:
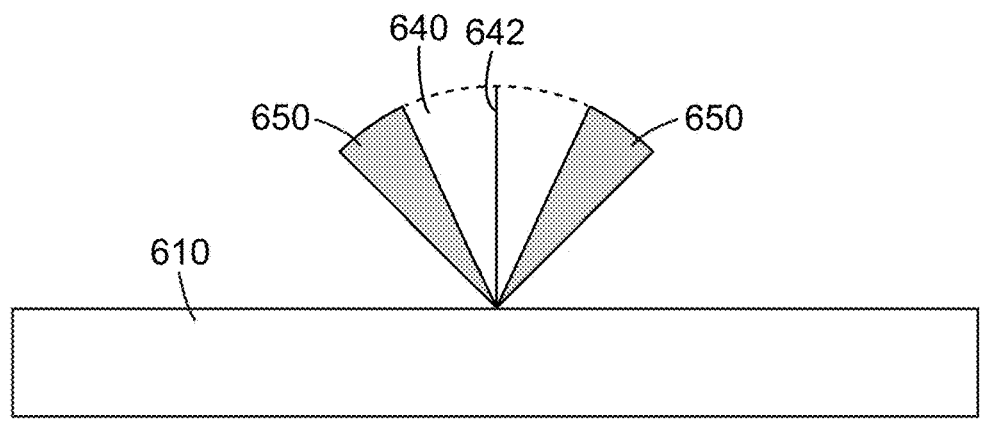
FIG. 6 is another schematic side elevation cross-section showing first and second sets of characteristic viewing angles.

FIG. 6 is another schematic side elevation cross-section showing first and second sets of characteristic viewing angles. Here, first set of characteristic angles 640 having midline 642 is a substantially centered wide band, which is partially overlapped by a split second set of characteristic angles 650, having a common midline with the first set. As in FIGS. 4 and 5, asymmetric turning film 610 represents the rest of the optical system. Applications for the distribution illustrated in FIG. 6, if illuminated simultaneously, include navigation and alignment. For example, green light may be provided by the first light source and is viewable within the first set of characteristic angles, while the second light source may provide red light within the second set of characteristic angles. A viewer would then have visual clues whether, for example, he or a vehicle he is controlling such as an automobile, boat, or airplane is substantially aligned with a target axis (midline 642) (will appear as green), slightly off-axis (will appear as yellow, or green and red together), or substantially off-axis (will appear as red). Other applications and combinations and modifications of the depicted distributions may be desirable, and the examples and illustrations provided in FIGS. 4, 5, and 6 are merely intended to provide a sample of the variety available.

Displays including the optical systems described herein may contain additional conventional display components such as polarizers (absorbing and reflective) a liquid crystal (LC) panel including pixels and having subpixels that may correspond to different colors, such as red, green, and blue. For example, the asymmetric turning film may be laminated to or disposed next to one of the polarizers. Luminaires and lamps including the display may also include any suitable optical components or films, including additional turning films (asymmetric or symmetric), brightness enhancing films, diffusers, color filters, reflectors, polarizers and the like. Fundamentally the optical system described herein remains similar between these applications.

Exemplary embodiments include the following:

Item 1. An optical system, comprising:
a first light source and a second light source having differently oriented light distributions; and
an asymmetric turning film comprising a first major surface and a second major surface, wherein the first major surface is substantially smooth and the second major surface comprises a plurality of microstructures each comprising a first face having a first shape and a second face having a different second shape;
wherein light from the first light source is preferentially reflected by the first face but not the second face;
wherein light from the second light source is preferentially reflected by the second face but not the first face.

Item 2. The optical system of item 1, further comprising a lightguide configured to transport light from at least one of the first light source and the second light source.

Item 3. The optical system of item 2, wherein the lightguide is wedge-shaped.

Item 4. The optical system of item 2, further comprising a second lightguide configured to transport light from at least one of the first light source and the second light source.

Item 5. The optical system of item 4, wherein the lightguide and the second lightguide are stacked.

Item 6. The optical system of item 1, wherein the first shape is substantially flat and the second shape is substantially curved.

Item 7. The optical system of item 1, wherein each of the plurality of microstructures is the same lateral cross-sectional shape.

Item 8. The optical system of item 1, wherein both the first shape and the second shape are substantially flat.

Item 9. The optical system of item 1, wherein both the first shape and the second shape are substantially curved.

Item 10. The optical system of item 1, wherein each microstructure of the plurality of microstructures further comprises a third face having a third shape, wherein either light from the first light source is preferentially reflected by the first face and the third face but not the second face or light from the second light source is preferentially reflected by the second face and the third face but not the first face.

Item 11. The optical system of item 1, further comprising a second plurality of microstructures, each comprising a third face having a third shape and a fourth face having a different fourth shape, wherein the third face preferentially reflects light from the first light source but not the second light source, wherein the fourth face preferentially reflects light from the second light source but not the first light source, and wherein at least two of the first shape, the second shape, the third shape, and the fourth shape are different.

Item 12. The optical system of item 1, wherein the second major surface of the asymmetric turning film includes at least one of an antireflective coating or an antireflective structured surface.

Item 13. The optical system of item 1, wherein the first major surface of the asymmetric turning film includes at least one of an antireflective coating or an antireflective structured surface.

Item 14. The optical system of item 1, wherein at least one of the first face or the second face includes a sawtooth or sinusoidal surface.

Item 15. The optical system of item 1, wherein the plurality of microstructures comprises linear microstructures.

Item 16. The optical system of item 1, wherein the optical system has two display modes, wherein in the first mode, only the first light source emits light, and in the second mode, only the second light source emits light.

Item 17. The optical system of item 16, wherein the optical system has a third mode, wherein in the third mode, both the first light source and the second light source emits light.

Item 18. The optical system of item 1, wherein at least one of the first light source and the second light source comprises a plurality of LEDs.

Item 19. The optical system of item 1, wherein at least one of the first light source and the second light source emits substantially white light.

Item 20. The optical system of item 1, wherein at least one of the first light source and the second light source emits non-white light.

Item 21. The optical system of item 2, further comprising a second turning film disposed on the opposite side of the lightguide from the first asymmetric turning film.

Item 22. The optical system of item 21, wherein the second turning film is an asymmetric turning film.

Item 23. The optical system of item 22, wherein the second asymmetric turning film comprises a plurality of microstructures each having a third face having a third shape and a fourth face having a different fourth shape, wherein light from the first light source is preferentially reflected by the third face but not the fourth face and light from the second light source is preferentially reflected by the fourth face but not the third face.

Item 24. An optical system having a display surface and two display modes, wherein in the first mode, the display surface emits light having a first characteristic set of viewing angles, and wherein in the second mode the display surface emits light having a second characteristic set of viewing angles, wherein the first characteristic set of viewing angles and the second characteristic set of viewing angles have different widths.

Item 25. A luminaire comprising the optical system of item 1.

Item 26. A display comprising the optical system of item 1.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical system, comprising:
 a first light source and a second light source having differently oriented light distributions;
 an asymmetric turning film comprising a first major surface and a second major surface, wherein the first major surface is substantially smooth and the second major surface comprises a plurality of identical microstructures each comprising a first face having a first shape and a second face having a different second shape; and
 a polarizer;
 wherein light from the first light source is preferentially reflected by the first face but not the second face, and is transmitted through the second face;
 wherein light from the second light source is preferentially reflected by the second face but not the first face, and is transmitted through the first face;
 wherein the asymmetric turning film is laminated to the polarizer; and wherein the first shape is substantially flat and the second shape is substantially curved.

2. The optical system of claim 1, further comprising a lightguide configured to transport light from at least one of the first light source and the second light source.

3. The optical system of claim 2, further comprising a second lightguide configured to transport light from at least one of the first light source and the second light source.

4. The optical system of claim 3, wherein the first lightguide and the second lightguide are stacked.

5. The optical system of claim 1, wherein each of the plurality of microstructures is the same lateral cross-sectional shape.

6. The optical system of claim 1, wherein each microstructure of the plurality of microstructures further comprises a third face having a third shape, wherein either light from the first light source is preferentially reflected by the first face and the third face but not the second face or light from the second light source is preferentially reflected by the second face and the third face but not the first face.

7. The optical system of claim 1, further comprising a second plurality of microstructures, each comprising a third face having a third shape and a fourth face having a different fourth shape, wherein the third face preferentially reflects light from the first light source but not the second light source, wherein the fourth face preferentially reflects light from the second light source but not the first light source, and wherein at least two of the first shape, the second shape, the third shape, and the fourth shape are different.

8. The optical system of claim 1, wherein the second major surface of the asymmetric turning film includes at least one of an antireflective coating or an antireflective structured surface.

9. The optical system of claim 1, wherein at least one of the first face or the second face includes a sawtooth or sinusoidal surface.

10. The optical system of claim 1, wherein the optical system has two display modes, wherein in the first mode, only the first light source emits light, and in the second mode, only the second light source emits light.

11. The optical system of claim 10, wherein the optical system has a third mode, wherein in the third mode, both the first light source and the second light source emits light.

12. A luminaire comprising the optical system of claim 1.

13. A display comprising the optical system of claim 1.

* * * * *